C. C. CREWSON.
BRAKE MECHANISM.
APPLICATION FILED NOV. 22, 1919.

1,380,043.

Patented May 31, 1921.
2 SHEETS—SHEET 1.

Witness:
R. E. Hamilton

Inventor,
Chas. C. Crewson,
By George H. Thoper
atty.

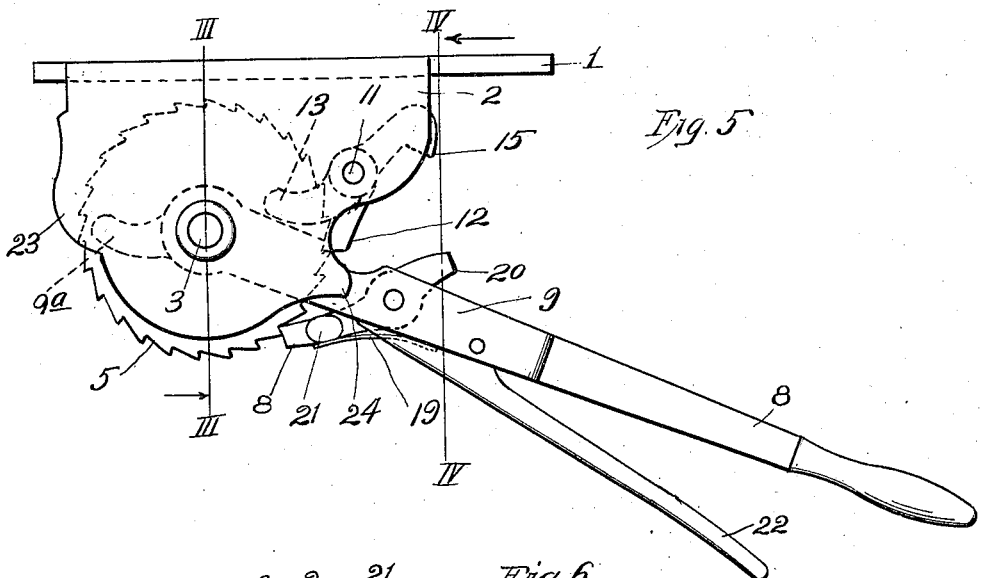
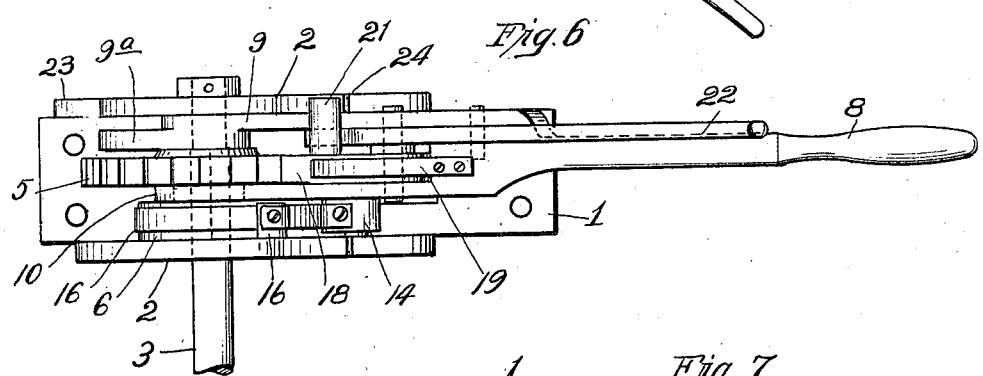
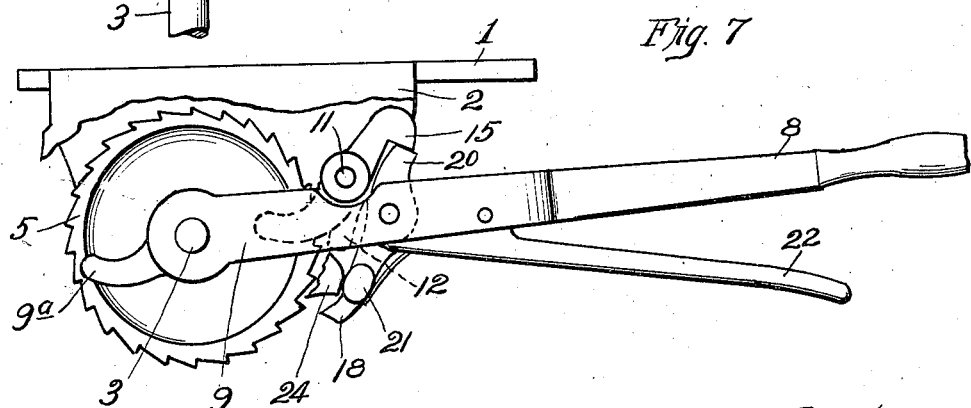

UNITED STATES PATENT OFFICE.

CHARLES C. CREWSON, OF KANSAS CITY, MISSOURI.

BRAKE MECHANISM.

1,380,043. Specification of Letters Patent. Patented May 31, 1921.

Application filed November 22, 1919. Serial No. 340,025.

*To all whom it may concern:*

Be it known that I, CHARLES C. CREWSON, a citizen of the United States, and resident of Kansas City, Jackson county, State of Missouri, have invented certain new and useful Improvements in Brake Mechanism, of which the following is a specification.

This invention relates to brake mechanism. As well known, air brake mechanism is very expensive as regards installation and maintenance, and is relatively costly in operation, and it has long been a desideratum—especially for street and interurban cars—to produce a simple, strong and durable brake mechanism of low initial cost and maintenance, but possessing the service stop efficiency of the air brake.

My object is to meet this requirement by producing a brake mechanism by which the motorman or operator, can arrest the car as accurately and as gently or gradually as such result can be accomplished with the well known air brake. A further object is to produce a brake mechanism which can be operated with one hand, as distinguished from the common type of manually-operable car brake embodying a hand-wheel on the brake staff, and a dog for engagement with a ratchet wheel on such staff, and disengageable from such wheel by means of the operator's foot. Another object is to produce a double-action brake mechanism susceptible of operation conveniently by the operator when occupying his usual position for control of the car, or when standing in the doorway of the car, to see more clearly just where it is most desirable to arrest the car.

With these objects in view the invention consists in certain novel and useful features of construction and combinations of parts as hereinafter described and claimed; and in order that it may be fully understood, reference is to be had to the accompanying drawings in which:

Fig. 5 is a plan view with the operating lever in an intermediate position and the dog or detent in operative position.

Fig. 6 is an edge view of the brake mechanism with the parts as shown in Fig. 5.

Fig. 7 is a plan view with the brake lever at the right hand end of its throw.

Figure 1:
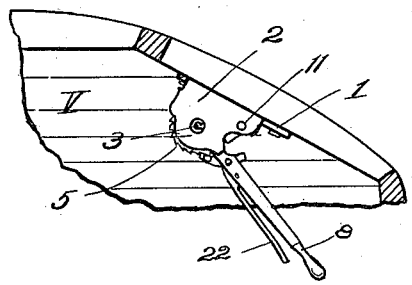
Figure 1 is a plan view of brake mechanism embodying the invention, as applied within the vestibule of a car.

In said drawings, the supporting frame of the mechanism is shown as applied within the vestibule, V, of a car, at a point between the controller and the front door, neither of which appears. The frame is in the form of a base 1 for bolting to the car, and having top and bottom arms 2 forming journal bearings for the customary vertical brake shaft or staff 3. Mounted on an angular portion 4 of the staff is the ratchet wheel 5 and a friction disk 6, the latter having a reduced hub 7, spacing it from the ratchet wheel.

An operating lever 8, is bifurcated to straddle the ratchet wheel, one of the tines, 9, of the lever, pivotally engaging the staff between the ratchet wheel and the adjacent support arm 2, and the other, 10, pivotally embracing the hub of the friction disk, this arrangement serving to guard against lateral play or vibration of the lever. The tine 9, terminates in a lug $9^a$, for tripping the detent or dog for holding the brakes firmly in operative position. This detent is pivotally mounted on a vertical pin 11 of the support, and is in the form of a rocker member, comprising the tooth 12, in the plane of and for engaging the ratchet wheel, and the arms 13 and 14, for respective engagement by lever lug $9^a$, and a friction-band, projecting in the same general direction as the detent, and a tail piece projecting in the opposite direction and provided with a trip-off shoulder 15.

The friction-band 16 encircles the friction disk 6, and is secured at one end to rocker arm 14, and is anchored at its opposite end to a pin 17, rigid with the adjacent support arm 2, the arrangement being such that the tripping of the detent applies the band to the friction disk, and this is true when the trip-off is effected by pressure of the lug $9^a$ on the arm 13 (when the lever is at the left hand end of its movement) or when the lever is at the right hand end of its movement, by pressure of the tail of a pawl 18, pivotally carried by the lever. The pawl is pressed against the ratchet wheel normally by a spring 19, and the tail 20 of the pawl is normally inoperative, functioning only when the lever attains its limit of movement to the right, when it engages the shoulder 15 of the rocker and trips the detent tooth 12 from engagement with the ratchet wheel.

Figure 2:
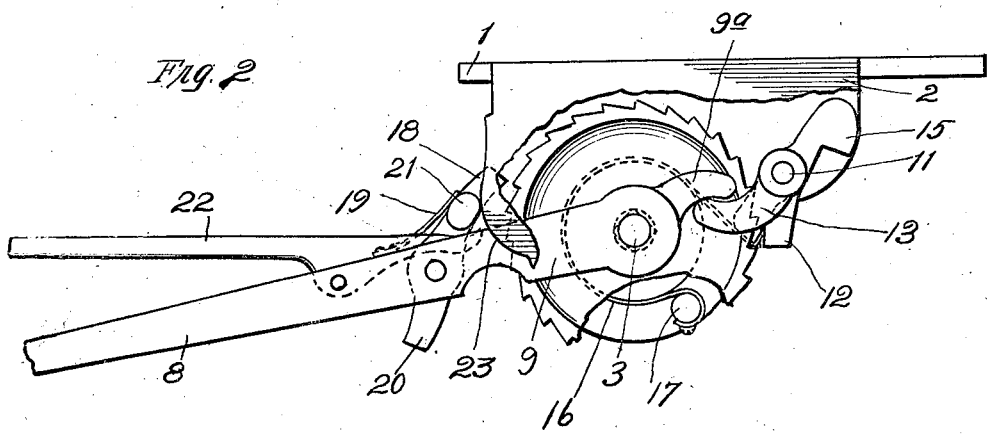
Fig. 2 is a similar but enlarged view of the brake mechanism with the frame thereof broken to expose parts otherwise hidden, and the operating lever at the left hand end of its throw.
Figure 3:
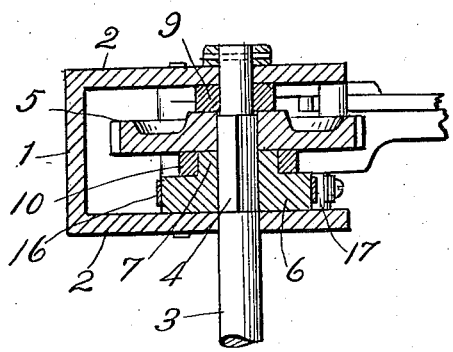
Fig. 3 is a vertical section on the line III—III of Fig. 5.
Figure 4:
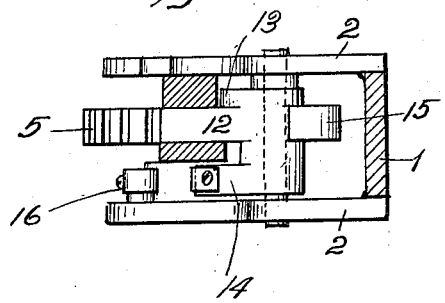
Fig. 4 is a view of the right hand end of the mechanism, with the lever in section adjacent the staff.

The pawl 18 is provided with a laterally projecting lug 21 in the path of operation of a trip-lever 22 carried by the lever 8. Pressure on said trip-lever toward the lever 8, applied by simply gripping the two levers by hand, causes the trip-lever to operate and trip the pawl from engagement with the ratchet wheel. Other means for automatically tripping the pawl when the lever 8 is at the left and right hand ends respectively, of its throw, are cams 23 and 24, formed on the edge of the upper arm 2 of the support or frame, but at opposite sides of the shaft 3, as shown most clearly by Fig. 5. In Fig. 2, the pawl is shown tripped by the cam 23, and the detent 12 is shown as tripped and the friction band as applied. In Fig. 7, the pawl is shown as tripped by the cam 24, and the tail of the pawl as engaged with the shoulder 15 of the rocker, for tripping the detent and applying the friction band. It will thus appear that the mechanism is double acting in that the brakes can be eased and tightened for accurate service stops of the car, when the lever 8 is at either end of its throw, and hence when the operator is standing in proximity to the controller or the door of the car.

Assuming that the brakes are applied so tightly that the staff cannot be turned to increase the tension of the brakes, and that the lever 8 is at some intermediate position between its two extremes of movement, it is desirable that the operator shall be able to swing the lever to such position that it shall occupy the most convenient place for releasing the brakes when necessary. To accomplish this he applies light pressure on the tripping lever 22 to withdraw the pawl to inoperative position, and then swings the lever 8 freely in the desired direction, it being understood that detent 12 is at this time holding the ratchet wheel against back rotation.

As the lug 21 attains the crest of the cam 23, in the movement of the lever 8 to the left, the lever tine lug 9ª, engages and operates rocker arm 13, and thereby simultaneously tightens the friction band on the friction disk and trips the detent 12 from engagement with the ratchet wheel, the friction mechanism thus holding the brakes applied. With the parts in the position mentioned, the operator can ease up on the lever and, while still holding the detent out of engagement with the ratchet wheel, slacken the friction band slightly to give more perfect control in arresting the car at the exact point desired.

To start the car with the parts positioned as described, the operator simply eases up on the lever to maintain the detent out of engagement with the ratchet wheel and slacken the friction band. This permits the tension of the brakes to spin the ratchet wheel backward and leave the car free for travel.

It will be noted, by reference to Fig. 7, that the detent 12, when the lever 8 is at the opposite extreme of its movement from that shown by Fig. 2, is tripped from engagement with the ratchet wheel through the engagement of the heel of the pawl with shoulder 15 of the rocker, and that through this rocker movement, the friction band is applied to hold the ratchet wheel against back rotation, it being also noted that when the brake lever is at this limit of its movement, the tripping lever performs no function.

With the lever at this limit of its movement, the motorman—for example when standing at the door,—can release or ease the pressure of the friction band preliminary to the starting or stopping of the car. It will be seen that when the lever is swung to the position mentioned, the heel of the pawl engages the shoulder 15 to trip the detent, but to make this action more certain and positive, it is desirable to employ the cam 24, which, lying in the path of lug 20 rocks the pawl. The said cam and lug 20, have an additional function in that they coöperatively retain the lever at the extreme position mentioned, so that it shall be ready for instant movement to effect application of the brakes in a single sweep of the lever, as is frequently desirable.

From the above description it will be apparent that I have produced a brake mechanism embodying the features of advantage set forth as desirable in the statement of the object of the invention, and while the preferred form of construction appears in the drawings, it is obvious that the invention is susceptible of modification in various particulars, without departing from the principle of construction and mode of operation involved.

I claim:

1. A brake mechanism, comprising a staff, a lever and mechanism operable by the lever to turn the staff for brake application purposes, and yieldingly-actuated means to prevent reverse operation of the staff, and reversible to free the staff through extreme movement of the lever in either direction.

2. A brake mechanism, comprising a staff, a lever and mechanism operable by the lever to turn the staff for brake application purposes, and yieldingly-actuated means to prevent reverse operation of the staff, reversible to free the staff through extreme movement of the lever in either direction, and means actuated by reversed movement of the yieldingly-actuated means, to apply braking force on the staff to control brake-releasing rotation thereof.

3. A brake mechanism, comprising a staff, a lever and mechanism operable by the lever to turn the staff in one direction for brake application purposes, a pivoted detent, yieldingly-actuated to prevent unbraking movement of the staff, a brake wheel rotatable with the staff, and a brake band around the wheel and secured at a fixed point at one end and at the other end movable with the detent; said detent being movable to inoperative position through extreme movement of the lever in either direction.

4. A brake mechanism comprising a staff, a ratchet wheel thereon, a friction element movable with said staff, a support having cams at opposite sides of the shaft, a detent yieldingly engaging the ratchet wheel, a lever having a pawl yieldingly engaging the ratchet wheel and provided with a laterally projecting lug, to be automatically tripped by either of said cams when the lever is swung to opposite extremes of its movement, means actuated by said lever in either of its extreme movements, to trip the detent from the ratchet wheel, and a brake element movable by said detent when tripped to engage the first named brake element to hold the staff more or less firmly against back rotation.

5. A brake mechanism comprising a staff, a ratchet wheel thereon, a friction element movable with said staff, a support having cams at opposite sides of the shaft, a detent yieldingly engaging the ratchet wheel, a lever having a pawl yieldingly engaging the ratchet wheel and provided with a laterally projecting lug to be automatically tripped by either of said cams when the lever is swung to opposite extremes of its movement, means actuated by said lever in either of its extreme movements, to trip the detent from the ratchet wheel, a brake element movable by said detent when tripped to engage the first named brake element to hold the staff more or less firmly against back rotation, and a tripping lever mounted on the first named lever, for tripping the pawl from engagement with the ratchet wheel, when said first named lever occupies an intermediate position.

In testimony whereof I hereto affix my signature.

CHARLES C. CREWSON.